United States Patent
Udagawa

[11] Patent Number: 5,536,024
[45] Date of Patent: Jul. 16, 1996

[54] METAL GASKET HAVING SEALING BEADS WITH DIFFERENT WIDTH AND HEIGHT

[75] Inventor: Tsunekazu Udagawa, Ichikawa, Japan

[73] Assignee: Ishikawa Gasket Co., Ltd., Tokyo, Japan

[21] Appl. No.: 352,074

[22] Filed: Nov. 30, 1994

[30] Foreign Application Priority Data

Dec. 1, 1993 [JP] Japan .................. 5-064418 U

[51] Int. Cl.$^6$ ................................ F16J 15/08
[52] U.S. Cl. ................ 277/235 B; 277/207 R; 277/236
[58] Field of Search .............. 277/235 B, 180, 277/236, 207 R, 235 R

[56] References Cited

U.S. PATENT DOCUMENTS

| | | | |
|---|---|---|---|
| 4,688,809 | 8/1987 | Deppe | 277/235 B |
| 4,711,456 | 12/1987 | Udagawa | 277/234 |
| 4,721,315 | 1/1988 | Ueta | 277/235 B |
| 4,765,634 | 8/1988 | Kobayashi et al. | 277/235 B |
| 4,915,398 | 4/1990 | Kitigawa | 277/235 B |
| 5,344,165 | 9/1994 | Miyaoh et al. | 277/235 B |
| 5,385,354 | 1/1995 | Hagiwara et al. | 277/235 B |

FOREIGN PATENT DOCUMENTS

| | | | |
|---|---|---|---|
| 0486255 | 5/1992 | European Pat. Off. | 277/235 B |
| 0523946 | 1/1993 | European Pat. Off. | 277/235 B |

*Primary Examiner*—Daniel G. DePumpo
*Attorney, Agent, or Firm*—Kanesaka & Takeuchi

[57] ABSTRACT

A metal gasket of the invention is used for an internal combustion engine having a plurality of cylinder bores therein. The gasket is formed of at least one metal plate. The metal plate includes a plurality of holes corresponding to the cylinder bores, and at least one intermediate portion between the holes adjacent to each other. A plurality of beads is formed around the respective holes. The width of the bead at the intermediate portion is narrower than that at the rest of the bead, and the height of the bead at the intermediate portion is higher than that at the rest of the bead. Thus, the bead at the intermediate portion provides a sufficient surface pressure to seal thereat.

5 Claims, 2 Drawing Sheets

METAL GASKET HAVING SEALING BEADS WITH DIFFERENT WIDTH AND HEIGHT

BACKGROUND OF THE INVENTION AND RELATED ART STATEMENT

The present invention relates to a metal gasket having sealing beads with different width and height for securely sealing around a hole, especially for an intermediate portion between cylinder bores.

In an internal combustion engine, an improvement has been made continuously to provide a light and high power engine. For example, a compression ratio of the engine may be increased, and a distance between the cylinder bores is made narrower. In case the distance between the cylinder bores is made narrow, the weight of the engine can be decreased. However, it may cause a sealing problem between the cylinder bores. Especially, it may be difficult to completely and securely seal the intermediate portion between the cylinder bores.

In U.S. Pat. No. 4,711,456, a sealing device for sealing around the cylinder bores includes beads around the cylinder bores, wherein the beads are joined at an intermediate portion between the cylinder bores.

In U.S. Pat. No. 5,344,165, a bead around a fluid hole is made to have different spring constant. Namely, a portion where a high tightening pressure is applied has a spring constant greater than a portion where a moderate tightening pressure is applied. The spring constant may be changed by changing the height, width or curvature of the bead.

In the prior art patents, the sealing beads may be joined at the intermediate portion between the cylinder bores, and the spring constant of the bead may be changed. However, no specific arrangement is made to securely seal around the cylinder bores for the engine with the narrow intermediate portion.

Accordingly, one object of the invention is to provide a metal gasket, which can seal properly for an engine with a narrow intermediate portion between the cylinder bores.

Another object of the invention is to provide a metal gasket as stated above, which can provide sufficient high surface pressure at the intermediate portion when the gasket is tightened.

A further object of the invention is to provide a metal gasket as stated above, which can be manufactured easily and economically.

Further objects and advantages of the invention will be apparent from the following description of the invention.

SUMMARY OF THE INVENTION

A metal gasket of the invention is used for an internal combustion engine having a plurality of cylinder bores therein. The gasket is formed of a metal plate extending substantially throughout an entire area of the engine. The metal plate includes a plurality of holes corresponding to the cylinder bores, and at least one intermediate portion formed between the holes adjacent to each other.

A plurality of beads is formed around the respective holes. The width at the intermediate portion is made narrower than that at the rest of the bead, and the height at the intermediate portion is higher than that at the rest of the bead. Thus, the bead at the intermediate portion provides a surface pressure equal to or greater than that in the rest of the bead when the gasket is tightened.

The beads may be separately formed around the holes without connecting to the adjacent bead. On the contrary, the beads surrounding the holes may be connected together at the intermediate portion to form a common portion. The height and the width of the bead at the intermediate portion are arranged such that as a distance between the holes is narrower, the height of the bead increases and the width of the bead decreases.

Accordingly, it is possible to provide high surface pressure at the narrow portion in the intermediate portion when the gasket is compressed. Thus, the gasket can be sealed properly at the intermediate portion.

The metal gasket may further include at least one other metal plate to laminate the metal plate to thereby constitute a metal laminate gasket.

DETAILED DESCRIPTION OF PREFERRED EMBODIMENTS

Figure 1:
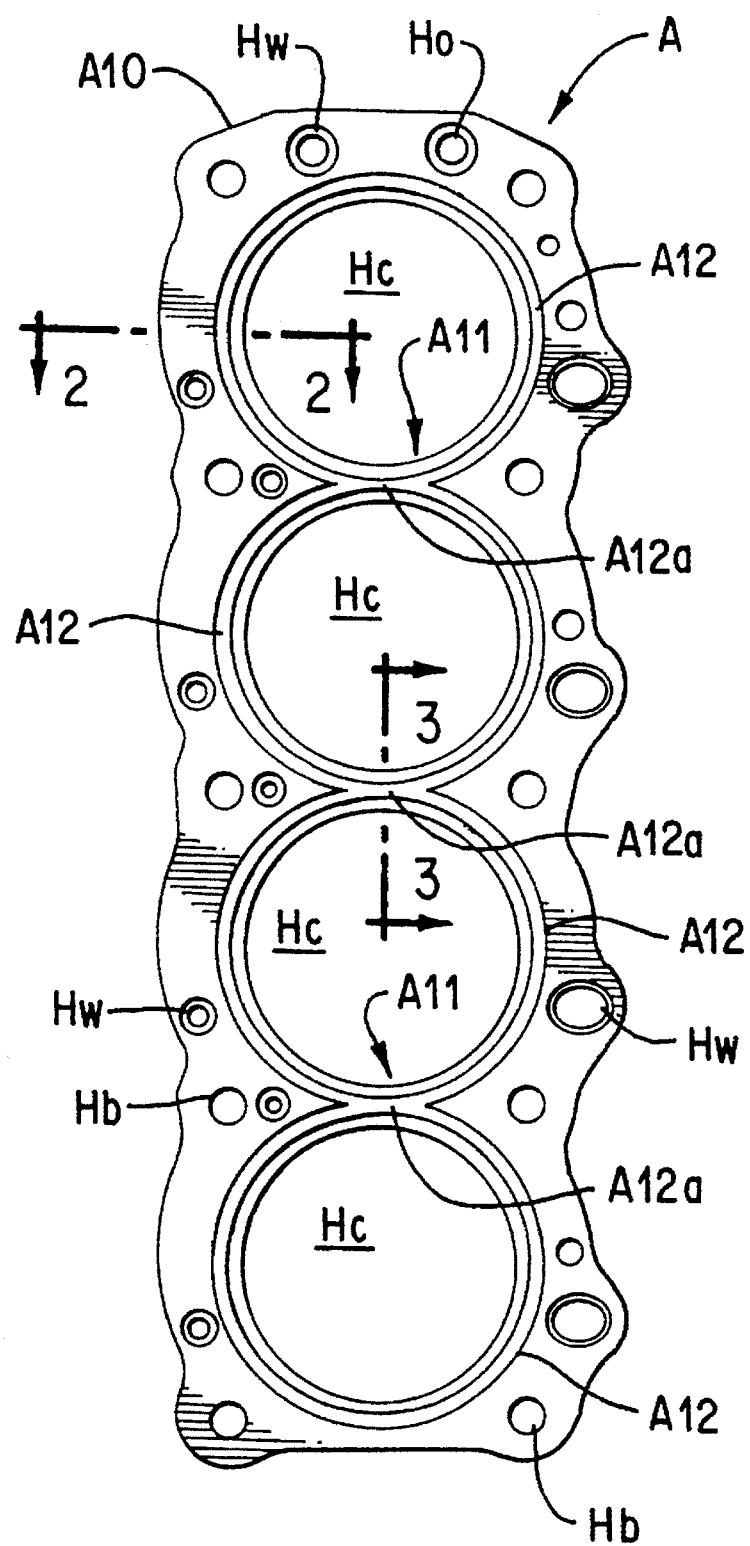
FIG. 1 is a plan view of a first embodiment of a metal gasket of the invention.
Figure 2:
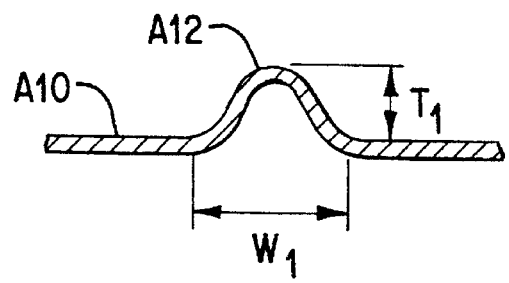
FIG. 2 is an enlarged section view taken along a line 2—2 in FIG. 1.

Referring to FIGS. 1 and 2, a first embodiment A of a metal cylinder head gasket of the invention is shown. The gasket A includes four cylinder bores Hc, a plurality of water holes Hw, oil holes Ho, and bolt holes Hb, as in the conventional gasket. Since the present invention is directed to the sealing structure around the cylinder bores, the sealing mechanisms for other holes are not explained. Any conventional sealing mechanisms may be used.

The gasket A is a single metal gasket and is formed of a metal plate A10. The cylinder bores Hc of the metal plate A10 are arranged to have a relatively narrow space or distance therebetween. Namely, an engine that the gasket A is installed has a light weight and provides high power. Accordingly, high pressure and temperature are applied to the intermediate portions A11 between the cylinder bores Hc.

The metal plate A10 includes beads A12 around the cylinder bores Hc. The beads A12 located adjacent to each other are connected together to form a common portion A12a at the intermediate portion A11. Thus, all the beads A12 extend continuously.

Figure 3:
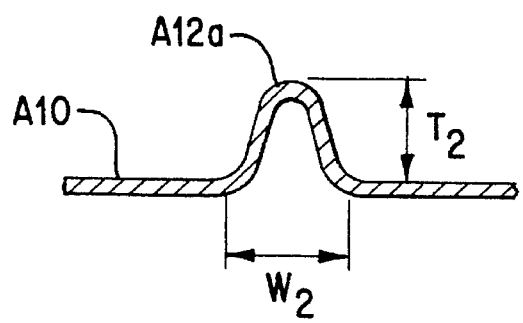
FIG. 3 is an enlarged section view taken along a line 3—3 in FIG. 1.

As shown in FIGS. 2 and 3, the bead A12 except the common portion A12a is constant in the width W1 and the height T1. The common portion A12a has the width W2 and the height T2, which do not change throughout the common portion A12a. The width W2 and the height T2 in the common portion A12a gradually change to the width W1 and the height T1. However, the width W2 and the height T2 may be changed such that as the distance at the intermediate portion A11 between the cylinder bores Hc decreases, the width W2 decreases and the height T2 increases.

In case the width of the bead decreases, the spring constant of the bead increases, i.e. high surface pressure is obtained when the bead is compressed. In case the height of the bead increases, the spring constant increases, as well.

In the gasket A, the common portion A12a has the width W2 narrower than the width W1 and the height T2 greater than the height T1. Thus, the common portion A12a can provide the surface pressure higher than the rest of the portion when the gasket A is compressed. The surface pressure at the common portion A12a is substantially equal to that at the rest of the bead. The surface pressure at the common portion A12a may be slightly higher than that at the rest of the bead.

Accordingly, the common portion A12a can securely seal the intermediate portion A11. Even if the common portion A12a is exposed to high temperature and high pressure from the cylinder bores Hc, creep relaxation does not substantially occur at the common portion A12a.

Figure 4:
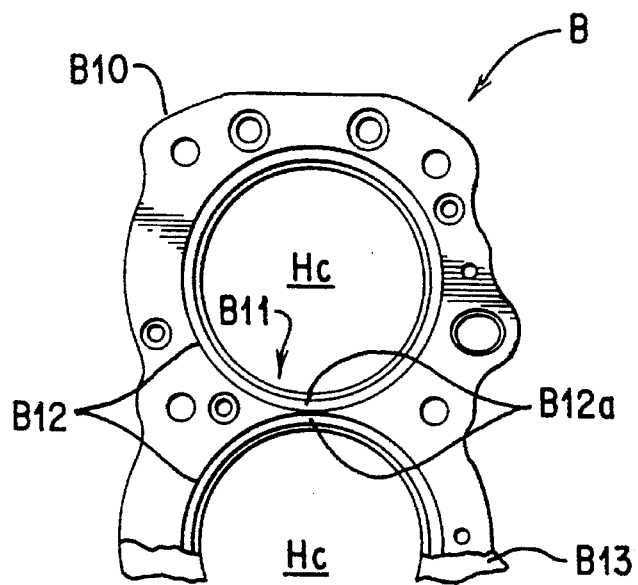
FIG. 4 is a plan view of a part of a second embodiment of a metal laminate gasket of the invention.

FIG. 4 is a plan view of a part of a second embodiment B of a metal gasket of the invention. The gasket B is a steel laminate gasket formed of an upper plate B13 and a lower plate B10. The lower plate B10 includes beads B12 around the cylinder bores Hc, which are formed independently without connecting together at an intermediate portion B11 between the cylinder bores Hc.

In the gasket B, as the distance at the intermediate portion B11 decreases, the width of a portion B12a of the bead B12 located at the intermediate portion B11 decreases and the height of the portion B12a of the bead B12 increases. Namely, at the center of the intermediate portion B11, the width of the bead portion B12a is shortest, and the height of the bead portion B12a is highest.

The width and the height of the bead portion B12a gradually change, and the bead portion except the portion B12a has the constant width and height. The width and height at the center of the bead portion B12a are the same as shown in FIG. 3, while the width and height of the rest of the bead B12 are the same as shown in FIG. 2.

In the gasket B, since the width of the bead B12 at the intermediate portion B11 is made narrow, two beads B12 can be disposed at the narrow intermediate portion B11. Since the bead portion B12a is high and narrow, the bead portion B12a can provide high surface pressure when the gasket B is compressed. Thus, the gasket B can securely seal the intermediate portion B11.

In the cylinder head gasket of the present invention, the bead portion at the intermediate portion between the cylinder bores is formed such that the width is made narrow and the height is made high. Accordingly, when the gasket is tightened, high surface pressure can be obtained at the intermediate portion to securely seal thereat.

While the invention has been explained with reference to the specific embodiments of the invention, the explanation is illustrative and the invention is limited only by the appended claims.

What is claimed is:

1. A metal gasket for an internal combustion engine having a plurality of cylinder bores therein, comprising:

a metal plate extending substantially throughout an entire area of the gasket, said metal plate having a plurality of holes corresponding to the cylinder bores, and at least one intermediate portion formed between the holes adjacent to each other, and a plurality of beads, each bead being formed around each hole and having a width and a height, the width at the intermediate portion being narrower than that at a rest of the bead and the height at the intermediate portion being higher than that at the rest of the bead, the height and the width of the bead at the intermediate portion being arranged such that as a distance between the holes is narrower, the height of the bead increases and the width of the bead decreases so that the bead at the intermediate portion provides a surface pressure to securely seal thereat.

2. A metal gasket according to claim 1, wherein said beads are separately formed around the holes without connecting to the adjacent bead.

3. A metal gasket for an internal combustion engine having a plurality of cylinder bores therein, comprising:

a metal plate extending substantially throughout an entire area of the gasket, said metal plate having a plurality of holes corresponding to the cylinder bores, and at least one intermediate portion formed between the holes adjacent to each other, and a plurality of beads, each bead being formed around each hole and having a width and a height, the beads surrounding the holes being connected together at the intermediate portion to form a common portion, the width at the common portion being narrower than that at a rest of the bead and the height at the common portion being higher than that at the rest of the bead, the height and the width of the bead at the common portion being arranged such that as a distance between the holes is narrower, the height of the bead increases and the width of the bead decreases so that the bead at the common portion provides a surface pressure to securely seal thereat.

4. A metal gasket according to claim 3, wherein the width and the height of the bead at the rest of the bead are substantially constant.

5. A metal gasket according to claim 4, further comprising at least one another plate to laminate the metal plate to constitute a laminate gasket.

* * * * *